(No Model.)
3 Sheets—Sheet 1.
F. GILL.
RUNNING GEAR FOR VEHICLES.
No. 264,277. Patented Sept. 12, 1882.
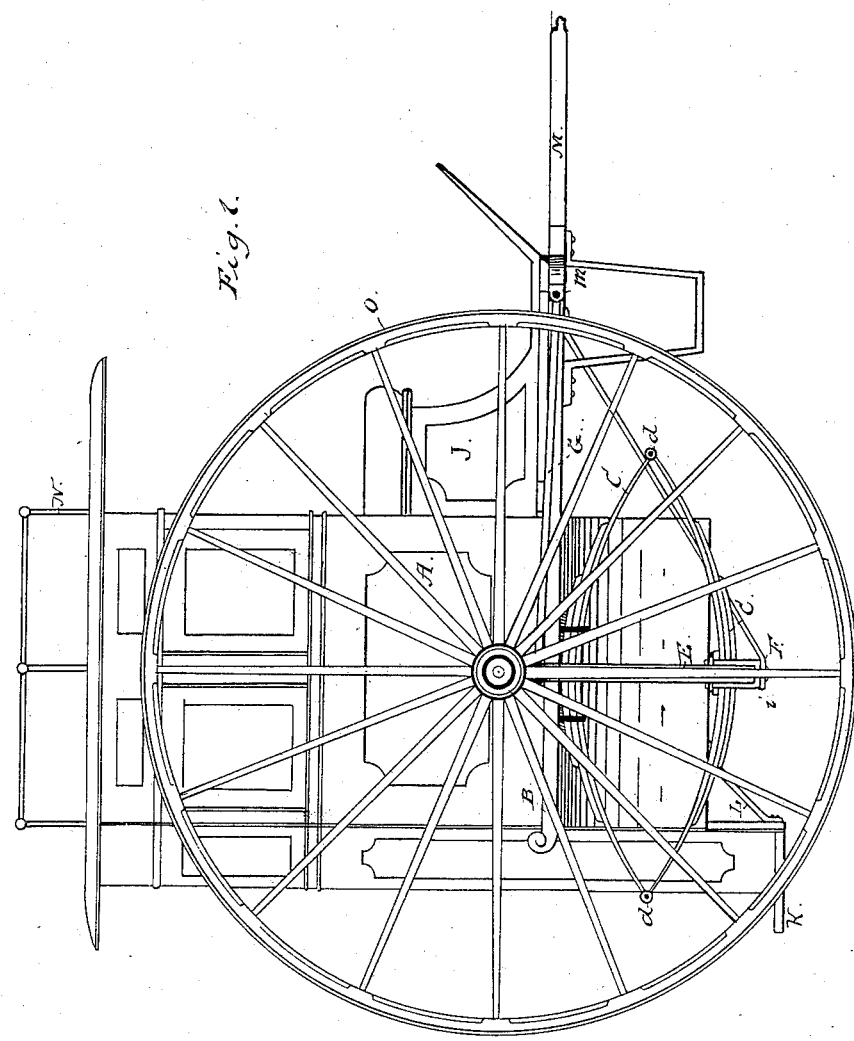
WITNESSES:
F. W. Howard
Jno. R. Young
INVENTOR
Fearing Gill
BY W. H. Doolittle
ATTORNEY

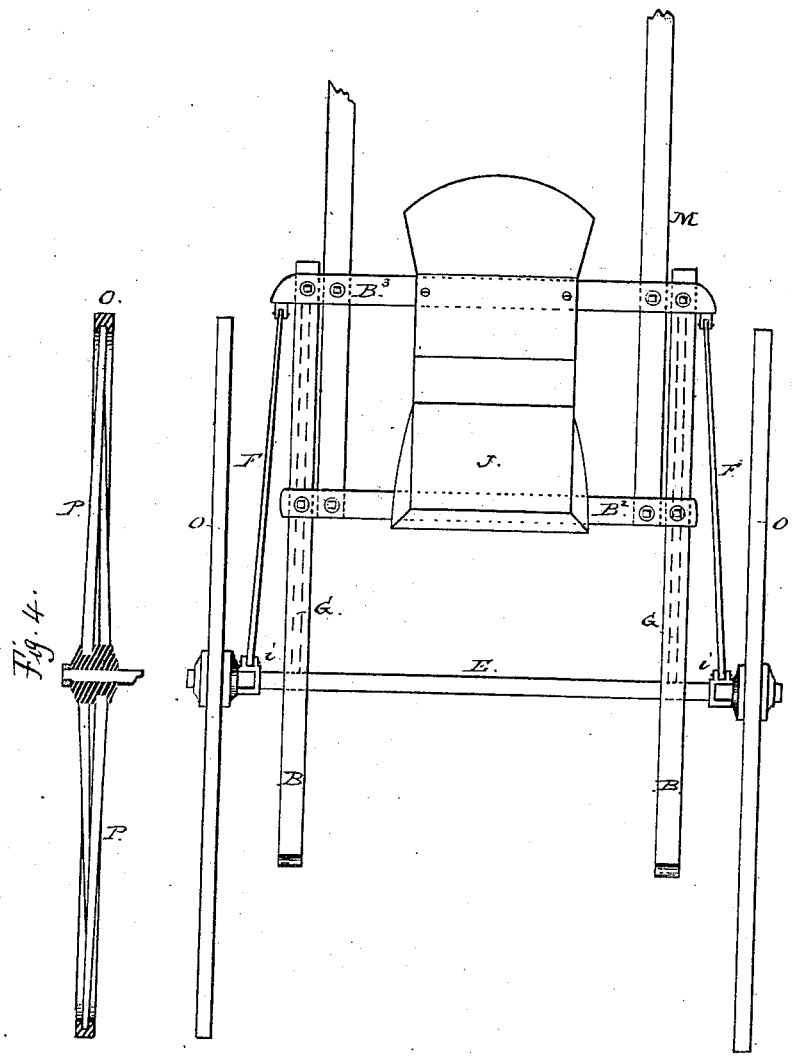

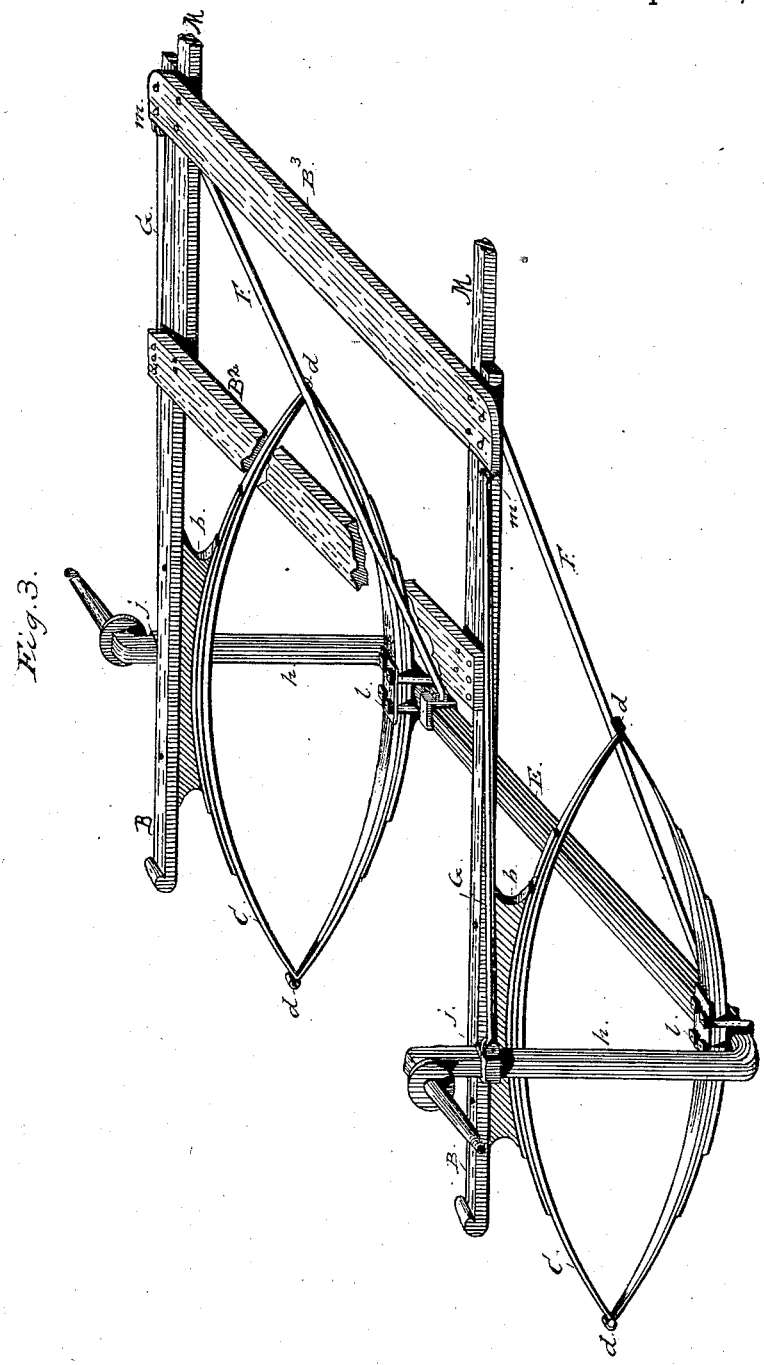

UNITED STATES PATENT OFFICE.

FEARING GILL, OF NEW YORK, N. Y.

RUNNING-GEAR FOR VEHICLES.

SPECIFICATION forming part of Letters Patent No. 264,277, dated September 12, 1882.

Application filed May 29, 1882. (No model.)

*To all whom it may concern:*

Be it known that I, FEARING GILL, a citizen of the United States, residing at New York city, in the county of New York and State of New York, have invented certain new and useful Improvements in Vehicles; and I do hereby declare the following to be a full, clear, and exact description of the invention, such as will enable others skilled in the art to which it appertains to make and use the same.

My invention relates to improvements in two and four wheeled vehicles designed to carry passengers and luggage; and it has for its object the arrangement of their parts in a more simple, economical, and effective manner, whereby such vehicles are rendered lighter and stronger and an increase of speed at which they are generally driven is easily and safely attained.

It consists of a novel arrangement of crank-axle and axle-braces, springs, body, and shafts, and, in connection with these, the employment of a large driving-wheel having alternated spokes of wood or metal and a metal top-railing for holding luggage.

My improvements are illustrated in the accompanying drawings, in which Figure 1 is a side elevation of a two-wheeled cab designed to seat four persons; Fig. 2, a plan view, showing frame on which the vehicle-body and the driver's seat rest; Fig. 3, a perspective view of the frame, springs, braces, and axle; and Fig. 4, a vertical section of the driving-wheel.

Like letters refer to like parts in the several views.

A is a cab-body, and J the driver's seat, both mounted on a frame composed of the side bars, B B, and the cross-pieces $B^2$ $B^3$. The body of the vehicle is supported by the side bars, and its lower portion extends down to nearly the cranked axle E.

To the crank-axle E, and just inside of its upright arms $h\ h$, are secured elliptic springs C C by means of clips $l\ l$. The members of these springs are united by pivotal connections $d$. The side bars, B B, and their supporting-blocks $b\ b$ rest upon and are secured to the upper members of the springs C C.

F F are diagonal braces, pivoted at their lower ends to straps $i$ on crank-axle E, close to where the springs C are secured to the axle, and, extending diagonally upward, are pivoted at their opposite ends to lugs, or by eyes and bolts to the end or under side of front cross-bar, $B^3$.

G G are axle-braces, their rear ends pivoted to straps $j\ j$ on and near the upper ends of the upright axle-arms $h\ h$, and, extending forward on a line with the side bars, are pivoted at their front ends to lugs $m\ m$ on the front cross-piece, $B^3$; or the said braces may be pivoted at those points to a properly-formed shoulder and socket. Thus the entire frame is not only securely braced, but a yielding spring motion given to all parts of the vehicle.

M M are shafts, which are attached in any suitable manner to cross-pieces $B^2$ $B^3$ of the frame, as shown in Fig. 2.

O O are large driving-wheels, which are preferably made seven feet in diameter, and are provided with alternated spokes P.

K is the step, secured to the rear of the body in a suitable manner, and braced also thereto by brace Z, extending from the rear of the step to the bottom of the body, as shown in Fig. 1.

N is a metal railing on top of cab, for holding luggage.

Having thus described my invention, what I claim, and desire to secure by Letters Patent, is—

The combination of the cranked axle, the diagonal braces F, the horizontal braces G, and the frame-work, substantially as described.

In testimony whereof I affix my signature in presence of two witnesses.

FEARING GILL.

Witnesses:
 JAMES P. LOWREY,
 RO. L. HARRISON.